April 17, 1962 A. J. DILLON, JR 3,029,804
STARTING MEANS FOR A TURBINE POWER PLANT
Filed Aug. 4, 1958 2 Sheets-Sheet 2
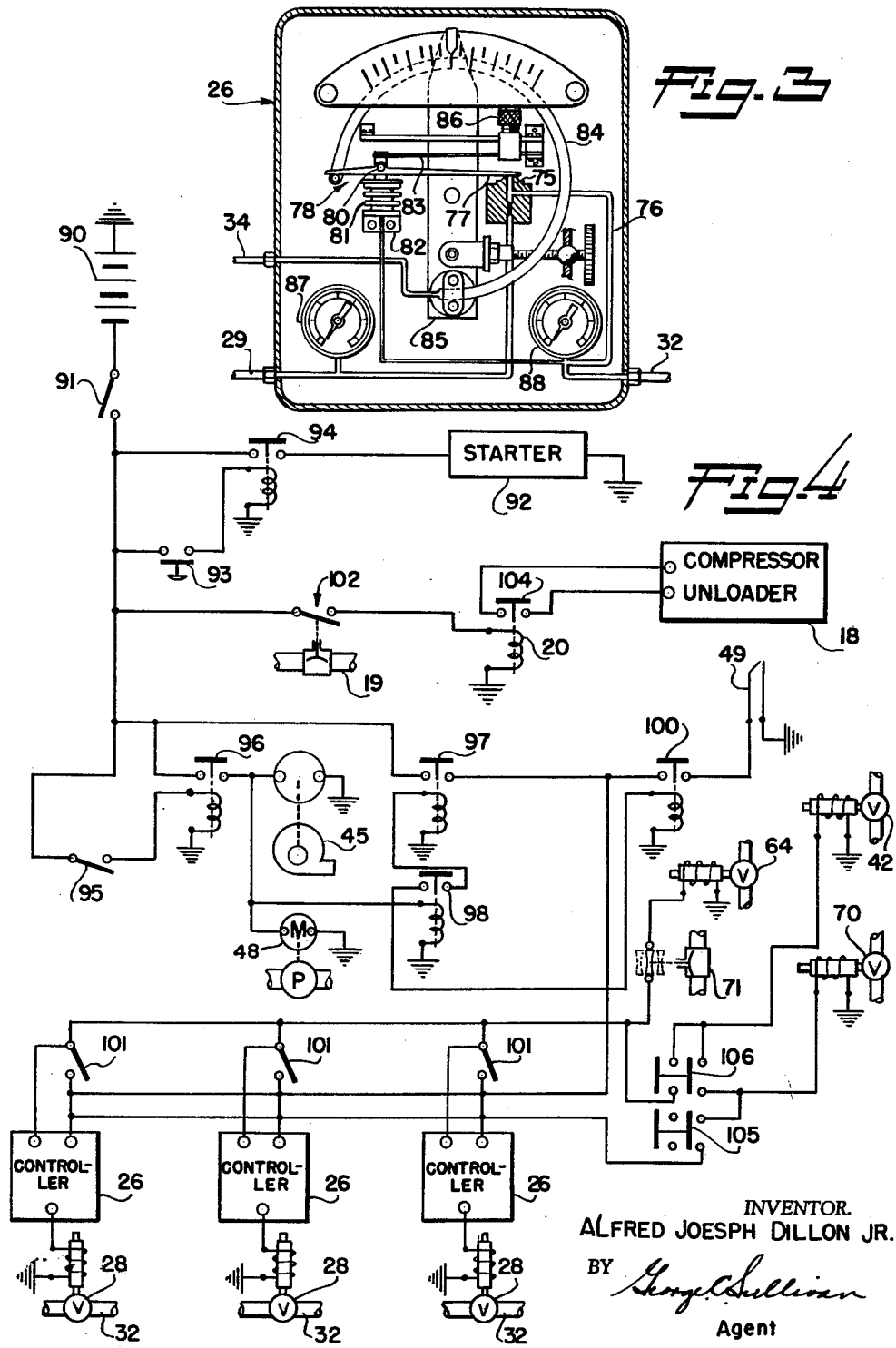
INVENTOR.
ALFRED JOESPH DILLON JR.
BY George C. Sullivan
Agent

# United States Patent Office 3,029,804
Patented Apr. 17, 1962

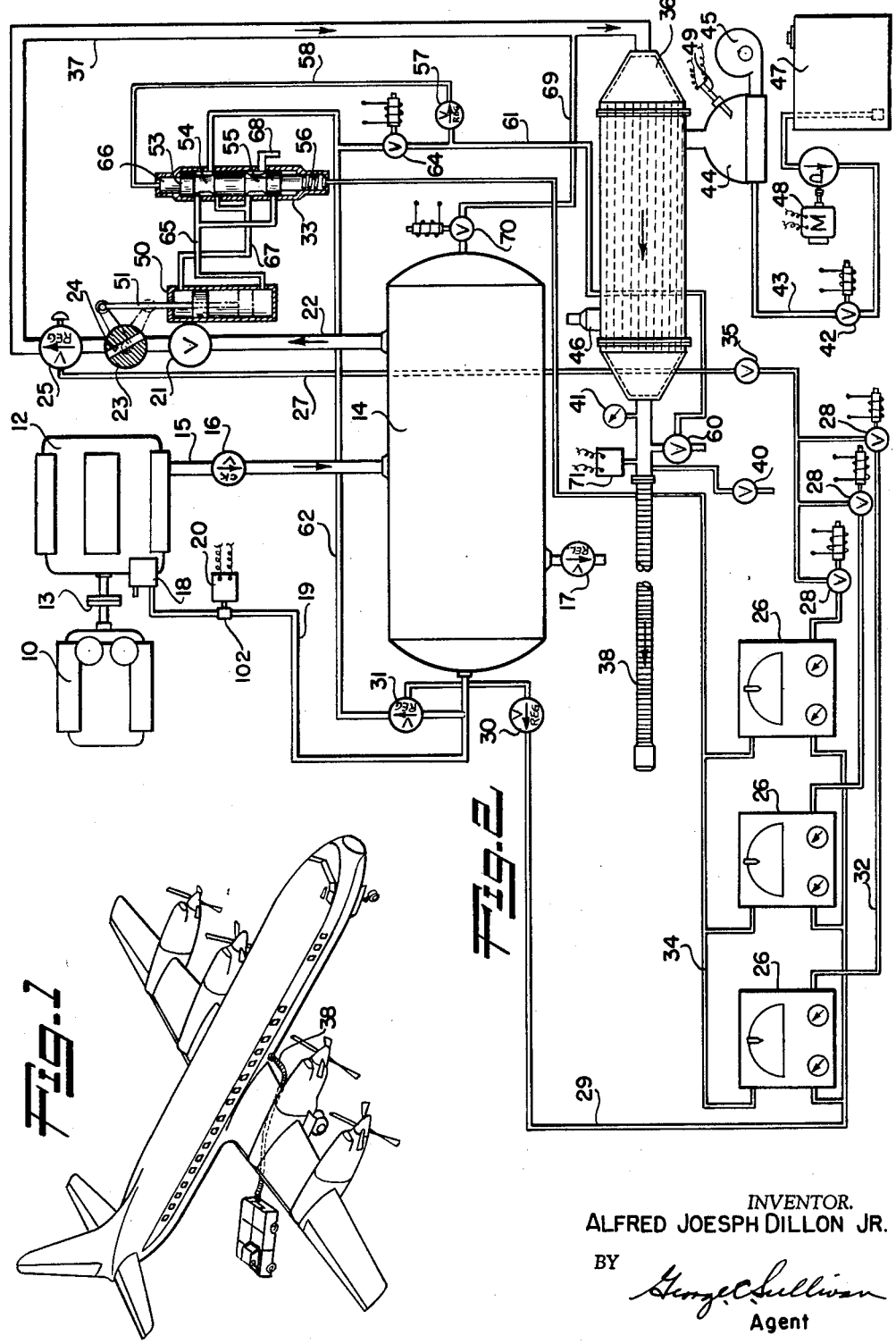

3,029,804
STARTING MEANS FOR A TURBINE
POWER PLANT
Alfred Joseph Dillon, Jr., Garden Grove, Calif., assignor, by mesne assignments, to Lockheed Aircraft Corporation, a corporation of California
Filed Aug. 4, 1958, Ser. No. 752,750
3 Claims. (Cl. 126—110)

This invention relates to prime movers of the internal combustion reaction type and of the turbo-compressor class, and relates more particularly to a starting system for such a power plant.

Power plants of the classes above mentioned are useful for the propulsion of aircraft and other vehicles. It has been found desirable in such applications to provide a starting system which is detachably connected with the power plant for initiating operation of the power plant. It is also important to obtain sequential operation of the starting system so that the process gases employed for starting the power plant may be properly conditioned. Because of the high pressures and temperatures involved in conditioning the process gases, conventional equipment has been highly unsuccessful because of the lack of safety features.

The device of the present invention provides a safe, sure engine starting means for engines which require a known volume of air at a known pressure and temperature. To reduce horsepower, high r.p.m. components and noise level, a storage tank is incorporated in the present invention which spreads the air compressing workload over a longer period of time than the few seconds necessary for engine starts. Heavy duty industrial equipment which operates at slow turning speeds is provided in the starter of the present invention which has replaced high speed, short-lived blowers and engines heretofore required. With the simplicity of design as a major concept, the present invention starter utilizes a minimum of major components wherein starting is automatic requiring little or no warm-up period in ambient temperatures ranging from approximately minus 45 degrees F. to 130 degrees F. and from sea-level to 7,500 feet altitude.

It is, therefore, a general object of the present invention to provide a starting system for a turbo-compressor type power plant which is provided with means for sequentially supplying an air flow to the power plant for starting purposes which has been properly conditioned respective to temperature and flow rate.

Another object of the present invention is to provide a power plant starting system which is simple, lightweight and economical which utilizes process air under pressure as the actuating medium for driving the plant starter which in turn drives the turbine and compressors of the power plant to bring them up to starting speed and to maintain that speed until the plant is self-motoring.

It is another object of the present invention to provide a pneumatic engine starter adaptable to meet the starting requirements for substantially turbine-type engines.

Still a further object is to employ safety features in the engine starting system of the present invention which automatically close or regulate the process air so that explosion of the starter is readily avoided.

Other objects of the invention and the various advantages and characteristics of the present engine starting apparatus will be apparent from a consideration of the following detailed description.

The invention consists in the several novel features which are hereinafter set forth and are more particularly defined by claims at the conclusion hereof. In the drawings which accompany and form a part of this specification or disclosure and in which like numerals of reference denote corresponding parts throughout the several views:

FIGURE 1 is a perspective view of an airplane and a pneumatic engine starter truck incorporating the present invention which is coupled to the airplane for power plant starting purposes;

FIGURE 2 is a flow diagram of the present invention employed for starting the power plants of the airplane of FIGURE 1;

FIGURE 3 is a diagram of a typical pressure controller employed in the starting system of FIGURE 2; and FIGURE 4 is a schematic diagram of the electrical system employed in the starting system of FIGURE 2.

With reference to FIGURE 2, a prime mover 10 is provided which actuates a conventional compressor 12 so that the compressor compresses air to approximately 600 p.s.i. which is supplied to a receiver 14 for storage via a pipe 15. The prime mover may be of any conventional design such as a standard industrial type internal combustion engine having an ignition system, battery, generator and electrical system. Such prime movers are usually equipped with a manually set throttle, choke and a conventional automatic generator.

Pipe 15 is connected between the compressor and receiver and is provided with a check valve 16 to prevent air from flowing from the air receiver back to the compressor. A relief valve 17 carried on the receiver protects the receiver against over-pressurization and is normally set to open at approximately 600 p.s.i.

Compressor 12 is provided with a compressor suction unloader 18 which is operated in response to a diaphragm type pressure switch 20 to automatically control the demand requirements of the compressor and receiver. Both the unloader and the switch are coupled in series in a line 19 connecting between the compressor and the receiver. Pressure switch 20 senses when the receiver is under and over-pressurized so that the unloader 18 may automatically govern the speed of the prime mover from idle speed to a predetermined working speed to recharge the receiver with compressed air.

A manually operated shut-off valve 21 is employed to enable closing off the air supply for maintenance purposes and is included in a pressure supply line 22. Coupled into supply line 22 on the side of the line opposite to its connection with valve 21, a rotary plug valve 23 is included having a rotor 24 operable to disrupt the air flow through the air pressure supply line. To control the pressures to be supplied to the engine starting system, a regulator valve 25 is included in the air pressure supply line which is operated by one of a plurality of pressure control units 26 via a connecting line 27.

The pressure control unit 26 may be adjusted to supply correct signal pressures to the regulator valve and the operation of a typical control unit will be described later. A choice of three control units is offered for descritive purposes wherein each unit is intended to supply different control signal pressures to the regulator valve 25. The operation of a particular control unit is selected by a panel mounted switch, the particular panel switch selected causes the operation of one of a plurality of solenoid operated valves 28 connected between the selected control unit and line 27. Each control unit 26 is connected to a line 29 which supplies air pressure to the unit from a regulator valve 30 connected in series with a regulator valve 31. Regulator valve 31 receives its source of air pressure from line 19 attached to the air receiver 14. Output lines 32 connected to each control unit couple the control unit to valves 28. Control pressure is provided to a valve 33 via a line 34 connected in parallel to each control unit. An air volume booster valve 35 is used to increase the amount of signal air supplied to the regulator valve 25. This makes the regulator 25 respond more quickly to the signal supplied by the selected control unit.

Leading from regulator valve 25 to a heat exchanger 36, there is employed a pressure supply line 37 which supplies what may be defined as process air to the heat exchanger. Heat exchanger 36 heats the process air and the process air is supplied via a conventional flexible tubing 38 to the aircraft starting motor (not shown).

It has been found desirable to employ a closed type heat exchanger to prevent contamination of the process air caused by the introduction of noxious or harmful gases. This type of heat exchanger is constructed in a manner that combustion air cannot come in direct contact with the process air. This feature permits the use of aircraft ducts for purposes other than engine starting if desired. Also, the introduction into the process air of solid particles is prevented so that filters or other screening or other screening devices are unnecessary to prevent damage to the aircraft engines, motor, ducts, etc. Heating by means of a closed type heat exchanger to a specified temperature provides the expansion of the process air to several atmospheres above normal and effects a greater power effort in the starting motor for a given air supply. Several safety features are present since the introduction of combustible or explosion producing gases into the process air stream is eliminated which prevents explosions in the aircraft, starting motor or ducting. A safer usage of the process air is available since the heat exchanger provides a positive instantaneous temperature control of the process air supply which can be shut off or opened fully in a matter of fractions of a second. The use of a closed type heat exchanger permits a selection of a variety of fuels for combustions. Fuels with high toxic end products can be used without the danger of contamination of the processed air.

Cold or process air is passed from duct 37 through the closed type heat exchanger 36. The air is heated to a preset temperature, approximately 500° F. for example, and is passed to the aircraft engine starting motor via flexible ducting 38. To prevent excessive pressures in the heat exchanger and the aircraft ducting including connecting hose, a safety relief valve 40 is installed immediately downstream of the exchanger. To provide a control of the temperature selected, a thermal responsive device 41 is installed immediately downstream of the exchanger to operate a burner fuel supply valve 42 located in a burner fuel supply line 43. This control valve is open when fuel is normally supplied to the burner, and closes when selected temperature is reached, thus preventing overheating of process air.

Combustion air is introduced to a combustion chamber 44 by means of a fan or blower 45 under pressure and is mixed in combination with vaporized fuel. Vaporized fuel mixture is ignited electrically and is passed through the heat exchanger 36 and thence discharged to the open air via an outlet 46. Heat from combustion of this mixture is passed into the process air in the heat exchanger. Combustion air blower 45 is started in advance of the introduction of any fuel into the combustion chamber in order to purge the combustion chamber of any residual or latent fuel gases or mixtures as a safety precaution. After combustion air blower 45 has purged the combustion chamber, an igniter 49 is energized by a time delay switch. Fuel is injected into the area under sufficient pressure to provide atomization and a rapid mixing of the fuel with the combustion air. The fuel may be contained in a storage container 47 and is pumped to the combustion chamber by means of a motor pump 48 via line 43 and burner valve 42. At the same time that fuel is introduced into the combustion chamber, igniter 49, which has been energized, causes combustion of the mixture. The igniter is continuous in operation during the entire time that the fuel valve 42 is open. In the event of a failure of the igniter to produce a spark or not operate, the fuel valve 42 is closed by an electrical interlock until the combustion chamber has been purged of any combustible gases.

Pneumatic operation of valve 23 is by means of an air cylinder 50 having a piston 51 connected to arm 24 of valve 23. The air cylinder is controlled by pneumatic control valve 33. Valve 33 is provided with a spindle 53 having reduced annular portions 54 and 55. A spring 56 is included in the housing of valve 33 which normally biases spindle 53 to the position as shown in FIGURE 2. One end of valve 33 is connected to a pressure reducing valve 57 via a line 58 which in turn, is connected in parallel to a pilot valve 60 via line 61 and to valve 31 by means of a line 62. Included in the high pressure line 62 extending to pressure reduction valve 57, there is provided a shut-off or starting valve 64. Purpose of valve 60 is to relieve pressure in line 37 and 38 when engine start is completed. This is accomplished when a signal is received from valve 64 allowing process air to flow and a signal to be applied to valve 60 causing valve 60 to close thus preventing bleed-off of process air to the atmosphere. Upon completion of engine start, the signal is removed from valve 60 allowing valve to resume normally open position.

As shown in FIGURE 2, air present in line 62 is presented to annular portion 54 which is passed through a line 65 into the air cylinder to force piston 51 to close valve 23 so that the supply of air from receiver 14 to the exchanger 23 is stopped. However, when operation has commenced valve 64 is open to supply pressure from line 62 to valve 57 and through line 58 to chamber 66 of valve 33. Pressure is thereby placed on the end of the spindle forcing the spindle to move against the biased tension of spring 56 so that air pressure present in line 62 will be passed through the portion 54 of the spindle and through a line 67 to the other side of the piston causing the piston to move rearward and the opening of valve 23. In each instance, lines 65 and 67 are interchanged with the annular reduced portions of the spindle for exhaust purposes through an outlet 68.

Connected between the heat exchanger and the receiver 14, there is provided a line 69 incorporating a solenoid operated bleed-off valve 70. When activated, this valve supplies sufficient process air of reduced pressure to the heat exchanger so that the temperature of the exchanger may be checked by gage 41 prior to the inroduction of process air under full pressure from line 37. In this manner, the heat exchanger is preheated which causes more uniform heating and eliminates hot spots which may exist in the exchanger.

A pressure sensitive switch 71 is coupled to the output of the heat exchanger which is electrically coupled to valve 64 as a safety feature so that excessive pressure or under-pressure will be sensed and cause valve 23 to close and thereby shut off the air supply to the heat exchanger. The operator for switch 71 as shown in FIGURE 4 is a diaphragm sealingly engaging at its periphery a portion of the wall of the heated air outlet of the heat exchanger. The diaphragm is provided with a biasing means biasing the diaphragm away from the wall towards the center of the pipe at a pressure corresponding to the selected outlet operating pressure so that when the outlet is at the selected pressure the diaphragm will be in central position. The switch operating shaft is fastened at one end to the center of the diaphragm and is operated thereby to move the movable switch contact member into contact with the stationary contacts when the diaphragm is in central position and to move same out of contact to one or the other side of the stationary contact members when the diaphragm is extended to one or the other sides by a decrease or increase of the outlet operating pressure from that selected.

With respect to FIGURE 3, a restriction meters the air supply to a nozzle 75 and in turn to the output system via piping 76 and line 32. When the nozzle is completely covered by a flapper 77, the flow of air through the metering restriction of the nozzle builds the pressure in the output system to a maximum. When the nozzle is uncovered, the pressure in the output system falls to zero. Whenever the output pressure is in equilibrium, a balance is established between the air passing through the metering restriction and that which escapes through the nozzle.

The flapper assembly 78 rotates freely on the bearing 80 mounted on the movable end of a proportional bellows 81. The proportional bellows is fixed at the other end to a plate mounting 82 and is directly connected to the output system from the nozzle. The free end of the proportional bellows is opposed by a leaf spring 83 and the travel of the bellows is proportional to the output pressure. A Bourdon tube 84 is shown mounted for direct action on a plate 85. An increase in controlling pressure causes the free end of the Bourdon tube to rotate the flapper clockwise about the bearing tending to cover the nozzle and increasing the output pressure. The resulting increase in pressure in the bellows tends to raise the flapper bearing and to cause the flapper to uncover the nozzle. Conversely, a decrease in control pressure cause the flapper to uncover the nozzle and decrease the output pressure. The proportional bellows tends to lower the flapper bearing and to cause the flapper to cover the nozzle. In normal operation, these reactions of the pressure in the bellows maintain the flapper in a position to throttle a steady output pressure.

The actual output pressure change must, therefore, be exactly proportional to the movement of the free end of the Bourdon tube, so long as such movements would not require output pressure values less than zero or greater than full supply pressure. Since the reaction of the bellows compensating for a movement of the Bourdon tube is instantaneous, a change in controlled pressure produces an instantaneous portionate change in the output pressure.

The function of a proportional adjustment knob 86 is to vary the effective length of the proportional leaf spring. As this knob is moved to the left, the effective length of the leaf spring is decreased, stiffening the resistance to the bellows' movement. Movement of the knob to the right increases the effective length and decreases the resistance to bellows' movement. The location of the adjustment knob determines the amount of the Bourdon tube which will be required to produce a change in the output pressure from 3 to 15 p.s.i. and, therefore, determines the magnitude of the proportional band. Supply pressure is indicated by gage 87, while output pressure is indicated by gage 88.

As shown in the FIGURE 4, an electrical system is shown for operating the various switches and solenoid operated valves employed in the pneumatic engine starting system as shown in FIGURE 2. The electrical system includes a conventional battery voltage source 90 which supplies the necessary voltage to the electrical system upon the closure of a manually operated switch 91. Operating voltage is supplied to the aircraft engine starter 92 by the closure of a manually operated switch 93 which in turn causes a solenoid operated closure 94 to supply continued voltage from supply 90. The closure of a manual switch 95 energizes solenoid closure 96 to commence operation of the blower motor 45 and the pump motor 48 to purge the heat exchanger preparatory to the burning of fuel to heat the combustion air. The actuation of closure 96 also causes the closure of solenoid operated switches 97 and 98. The closing of switch 98 causes the energization of a solenoid operated switch 100 which in turn through time delay supplies voltage to the igniter 49 located within the burner 44. The commencement of pump 47 causes fuel to be drawn from storage tank 47.

The closure of switch 97 provides voltage to each of the controller units 26 so that upon the actuation of a selected panel switch 101, a selected controller unit 26 will cause its associated relay to energize causing the opening of a selected valve 28 which supplies regulating air pressure to regulator valve 25 as shown in FIGURE 2.

A pressure switch contact 102 is normally open so that upon a pressure signal from the receiver 14 via line 19, the switch may be closed to energize solenoid operated switch 20 whose closure 104 causes the operation of the compressor unloader 18.

At such time as determined by the various gages and temperature pressures through the system, manually operated switch 106 may be closed to energize the coil of solenoid operated valve 42 which, in turn, supplies fuel to burner 44 where ignition takes place. In order to supply sufficient process air to the heat exchanger for temperature readings, switch 106 may be manually closed to energize solenoid operated valve 70 to supply limited process air to the heat exchanger.

In actual operation, engine 10 is started which causes the operation of air compressor 12 which compresses air and supplies this air to storage receiver 14 via line 15. When sufficient air has been supplied to the storage receiver 14, a valve 33 is supplied with control air via a line 62 which causes spindle 53 to position itself to supply control air to actuate piston 51 which, in turn, causes valve 23 to connect the output of the receiver 14 to supply process air via line 37 to the heat exchanger 36.

To provide combustion air to the heat exchanger, blower 45 is started in advance of introduction of fuel into the chamber 44 in order to purge the combustion chamber of any residual or latent fuel gases which may be present. Fuel is supplied to the combustion chamber by means of a power pump 47 via line 43. Igniter 49 is energized to ignite the fuel in the combustion chamber 44 and blower 45 forces the combustion air into the heat exchanger to heat the process air supplied from line 37. The heated high pressure processed air is transmitted through flexible ducting 38 to the engine starter of the aircraft engine.

The process air is regulated by means of regulator valve 25 operated by a pressure controller unit 26. A particular switch 101 is selected so that a particular controller 26 can be employed to select the proper control valve 28 to provide a regulation pressure signal to valve 25. In the event regulator 25 senses a condition whereby the process air is above or below pressure, the controller unit 25 visually displays the pressure reading.

Upon the actuation of the aircraft engine, the pressure of process air is reduced and switch 71 controls the solenoid of valve 64 which shuts off the supply of process air to the heat exchanger via the spindle valve 33 and valve 23.

Having described only typical forms of the invention we do not wish to be limited to the specific details herein set forth, but wish to reserve to ourselves any variations or modifications that may appear to those skilled in the art and fall within the scope of the following claims.

I claim:

1. A starting system for a gas turbine power plant comprising, a heat exchanger having an air inlet and an heated air outlet, a source of process air under predetermined pressure connected to the air inlet of the heat exchanger, a process air shut-off means including valve means between said process air source and said exchanger air inlet and pressure sensing means downstream of said heat exchanger responsive to pressure above and below the predetermined pressure to close said valve means, a source of heated combustion gases connected to the heat exchanger, means in the heat exchanger for heating the process air by the combustion gases without intermixing, means including a blower connected to the heat exchanger for forcing hot combustion gases therethrough and an outlet ducting connected to the heated air outlet of the heat exchanger and detachably connectable to the gas turbine power plant for conducting heated process air under pressure to the plant.

2. A starting system for a gas turbine power plant comprising, a heat exchanger having an air inlet and an heated air outlet, a source of process air under predetermined pressure connected to the air inlet of the heat exchanger, pressure regulating means included in the source of process air maintaining the predetermined pressure, a process air shut-off means connected between the source of process air and the heat exchanger air inlet, electrically operated actuating means for said shut-off means including a pressure operated switch downstream of said heat exchanger responsive to pressure above and below the predetermined pressure to close said shut-off means, a source of heated combustion gases connected to the heat exchanger, means in the heat exchanger for heating the process air by the combustion gases without intermixing, and means connected to the heat exchanger for forcing combustion gases therethrough and an outlet ducting connected to the heated air outlet of the heat exchanger and detachably connectable to the gas turbine power plant for conducting process air under pressure to the plant.

3. A starting system for a gas turbine power plant comprising, a heat exchanger having an air inlet and an heated air outlet, a source of process air connected to the air inlet of the heat exchanger, a pressure regulator valve coupled between said source of process air and the air inlet of the heat exchanger, a controller operably connected to said regulator valve to control said heat exchanger, said controller being coupled to the source of process air and being responsive to the pressure thereof to regulate said valve to increase flow therethrough as the process air pressure decreases, whereby the pressure of the process air supplied to the heat exchanger remains substantially constant, a process air shut-off means connected between the source of process air and the heat exchanger air inlet, electrically operated actuating means for said shut-off means including a pressure operated switch downstream of said heat exchanger responsive to pressure above and below the predetermined pressure to close said shut-off means, a source of heated combustion gases connected to the heat exchanger, means in the heat exchanger for heating the process air by the combustion gases without intermixing, means connected to the heat exchanger for forcing combustion gases therethrough and an outlet ducting connected to the heated air outlet of the heat exchanger and detachably connectable to the gas turbine power plant for conducting heated process air under pressure to the plant.

References Cited in the file of this patent
UNITED STATES PATENTS

| | | |
|---|---|---|
| 1,757,716 | Johnson | May 6, 1930 |
| 2,357,404 | Heymann et al. | Sept. 5, 1944 |
| 2,524,637 | Ruegg | Oct. 3, 1950 |
| 2,532,994 | Chausse | Dec. 5, 1950 |
| 2,785,698 | Vance | Mar. 19, 1957 |
| 2,968,152 | Moore | Jan. 17, 1961 |